United States Patent [19]
Cordebar

[11] Patent Number: 6,135,517
[45] Date of Patent: Oct. 24, 2000

[54] DEVICE FOR FASTENING A BUMPER FAIRING TO A MOTOR VEHICLE FENDER

[75] Inventor: Francis Cordebar, Oyonnax, France

[73] Assignee: Compagnie Plastic Omnium, Lyons, France

[21] Appl. No.: 09/346,838

[22] Filed: Jul. 2, 1999

[30] Foreign Application Priority Data

Jul. 7, 1998 [FR] France .................................. 98 08677

[51] Int. Cl.$^7$ ....................................................... A45F 5/00
[52] U.S. Cl. ........................... 293/155; 293/154; 293/128; 256/198
[58] Field of Search ............................ 296/198; 293/154, 293/155, 128

[56] References Cited

U.S. PATENT DOCUMENTS

| | | | |
|---|---|---|---|
| 4,440,438 | 4/1984 | Miyoshi et al. | 296/198 |
| 4,483,559 | 11/1984 | Lewis et al. | 293/155 |
| 4,875,728 | 10/1989 | Copp et al. | 293/155 |
| 5,108,138 | 4/1992 | Kawaguchi et al. | 293/155 |
| 5,139,306 | 8/1992 | Ott et al. | 296/198 |
| 5,188,408 | 2/1993 | Berdan et al. | 293/155 |
| 5,195,793 | 3/1993 | Maki | 293/128 |
| 5,202,172 | 4/1993 | Graf | 293/128 |
| 5,618,074 | 4/1997 | Weast | 293/155 |
| 5,639,522 | 6/1997 | Maki et al. | 293/128 |
| 5,882,054 | 3/1999 | Devilliers et al. | 293/155 |
| 6,003,933 | 12/1999 | Rinklin | 293/154 |
| 6,010,169 | 1/2000 | Cox et al. | 293/155 |

FOREIGN PATENT DOCUMENTS

| | | | |
|---|---|---|---|
| 2 728 846 | 7/1996 | France . | |
| 2 744 966 | 8/1997 | France . | |
| 0057471 | 3/1986 | Japan | 296/198 |
| 0235180 | 9/1988 | Japan | 296/198 |
| 0041986 | 2/1990 | Japan | 296/198 |
| 96 08393 | 3/1996 | WIPO . | |

*Primary Examiner*—Joseph D. Pape
*Assistant Examiner*—Kiran Patel
*Attorney, Agent, or Firm*—Schweitzer Cornman Gross & Bondell LLP

[57] ABSTRACT

A device for fastening bumper fairings to the fenders of a motor vehicle. A window is formed in the rim of the bumper fairing and a resilient tongue is provided in the fender to penetrate into said window when the bumper is in place, thereby holding the rim in its housing.

12 Claims, 9 Drawing Sheets

FIG_3

FIG_4

FIG_5

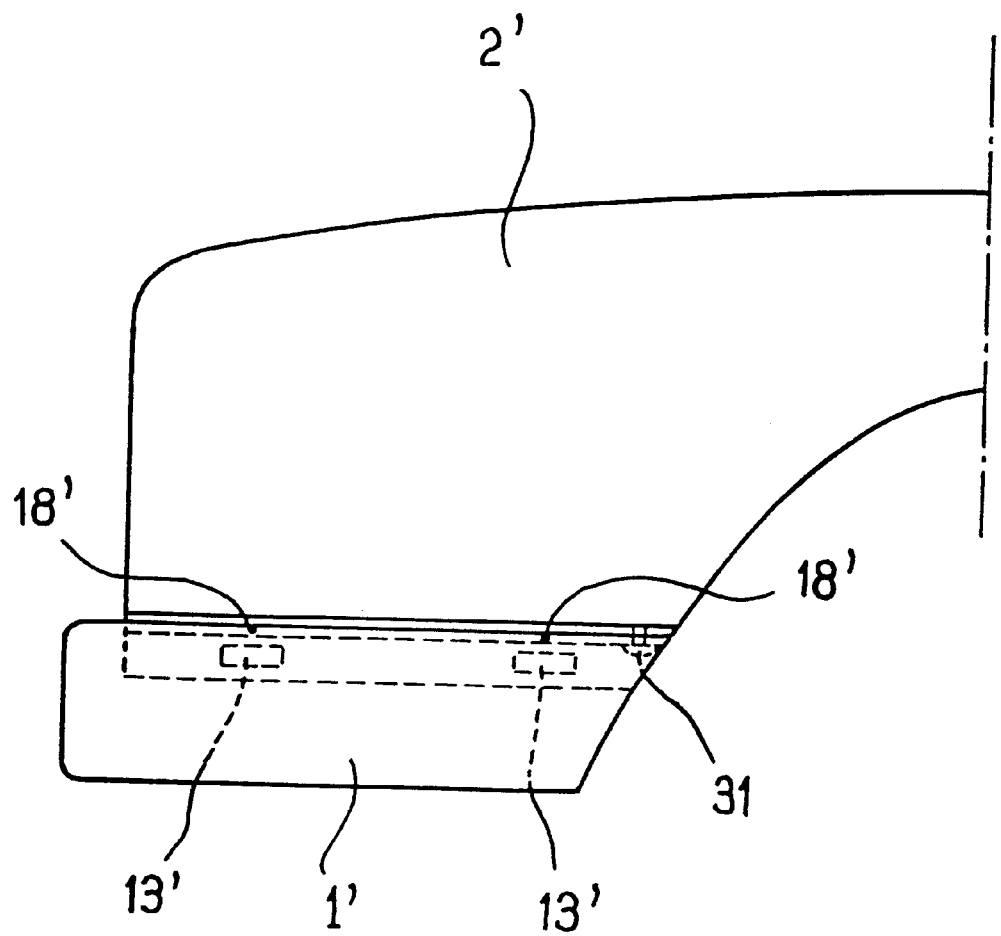
FIG_9

DEVICE FOR FASTENING A BUMPER FAIRING TO A MOTOR VEHICLE FENDER

The present invention relates to a device for fastening a bumper fairing to a motor vehicle fender.

BACKGROUND OF THE INVENTION

The Applicant company has already described, in its French patent application published under the No. 2 728 846, a device for fastening or putting into position the corner fairing of a bumper on the front fender of a motor vehicle.

For each bumper fairing, such a device comprises an inwardly-directed plane top rim and, beneath the front bottom edge of the fender, a housing for said rim, the thickness of the housing being substantially equal to or slightly greater than the thickness of said rim, a window being formed in the rim of the bumper fairing and a resilient tongue being provided in the thickness of the housing to penetrate into said window when the bumper is in position, and to hold the rim in the housing.

The device described in that prior application has pairs of reference surfaces and of reference-engaging surfaces, and an abutment surface and an abutment-engaging surface which enable the fairings of the bumper to be accurately positioned merely by being moved in translation towards the rear of the vehicle.

In that prior device, the rim of the fairing can move in the housing only in translation towards the front or the rear of the vehicle, and that gives rise to two difficulties when implementing that known fastening device.

Firstly, bumpers can be dismantled only by movement in translation towards the front thereof, and that is not always possible if the vehicle has suffered a collision, yet collision is the main reason why bumpers are replaced.

Furthermore, installing bumpers by moving them in translation towards the rear requires the bumper fairings to be accurately in alignment with the housings provided in the fenders, and in practice this condition is rarely satisfied because bumpers coming from a manufacturing line are subjected to internal stresses that cause them to twist, so that their fairings move towards each other or move apart.

OBJECTS AND SUMMARY OF THE INVENTION

The present invention seeks to provide a novel fastening device making it possible both to install and to dismantle bumpers on vehicle fenders with a minimum amount of handling, and to do so with the fairings being brought up to the fenders in a variety of ways.

In other words, the invention makes it possible for the movement in translation of each fairing towards its fender to be performed at some arbitrary angle.

The present invention provides a device for fastening bumper fairings to the fenders of a motor vehicle, the device comprising, on each bumper fairing, an inwardly-directed plane top rim and, beneath the front bottom edge of a fender, a housing for said rim, the thickness of the housing being substantially equal to or slightly greater than the thickness of said rim, a window being formed in the rim of the bumper fairing, while a resilient tongue is provided in the thickness of the housing to penetrate into said window when the bumper is in place, thereby retaining the rim in its housing, wherein the tongue has a projection designed to penetrate into the window of the rim, and wherein the projection is provided on its outer side directed towards the outside of the vehicle, with a first chamfer which, during movement of the fairing in translation perpendicular to the travel direction of the vehicle, causes the tongue to retract on engaging the edge of the fairing, and on its front side directed towards the front of the vehicle, with a second chamfer which, during sliding of the fairing towards the rear of the vehicle, causes the tongue to retract on engaging the rim of the fairing.

By means of its two chamfers, the projection can thus take advantage of any movement in translation of the fender in an arbitrary direction providing it has a component perpendicular to the travel direction of the component, and a component that is directed towards of the vehicle, thereby causing the tongue to be retracted and enabling the bumper to be put into position, regardless of the initial shape thereof.

In a preferred embodiment of the invention, the projection also has a third chamfer on its rear side facing towards the rear of the vehicle, to cause the tongue to retract during sliding of the fairing towards the front of the vehicle inside the housing, thereby enabling the bumper to be dismantled.

It will be understood that the forward sliding of the fairing that is required to cause the tongue to retract and enable the bumper to be dismantled, must be performed over a stroke that is relatively short, corresponding to the length of the third chamfer. The subsequent movement of the fairing can then be directed along any angle.

In order to retain the bumper in the travel direction of the vehicle, the device also has a screw passing through both the fairing and the fender. Removing this single screw makes it possible, by sliding movement in the above-specified forward direction, to separate the rim of the fairing from the housing.

In a preferred embodiment of the invention, the portions of the fender belonging to the fastening device are integrally formed with said fender, during injection molding thereof using a plastic material.

The same applies to the plane top rim of the bumper.

Advantageously, the lateral positioning of the fairing relative to the fender is provided accurately by means of abutments being presented in the bottom of the housing receiving the rim.

The present invention has an alternative embodiment wherein the window is provided not in the rim of the bumper fairing but in the fender and the tongue is provided not in the fender but in the rim of the bumper fairing.

In this embodiment, the present invention provides a device for a device for fastening bumper fairings to the fenders of a motor vehicle, the device comprising, on each bumper fairing, an inwardly-directed plane top rim and, beneath the front bottom edge of a fender, a housing for said rim between two substantially parallel walls, the thickness of the housing being substantially equal to or slightly greater than the thickness of said rim, a window being formed in one of the walls of the housing, while a resilient tongue is provided in the rim of the bumper fairing, protruding towards said window to penetrate into said window when the bumper is in place, thereby retaining the rim in its housing, wherein the tongue has a projection designed to penetrate into the window of the rim, and wherein the projection is provided on its inner side directed towards the inside of the vehicle, with a first chamfer which, during movement of the fairing in translation perpendicular to the travel direction of the vehicle, causes the tongue to retract on engaging the edge of the fairing, and on its rear side directed towards the rear of the vehicle, with a second chamfer which, during sliding of the fairing towards the rear of the vehicle, causes the tongue to retract on engaging the rim of the fairing.

In this embodiment, the third chamfer is located on the front side of the projection, facing towards the front of the vehicle, to cause the tongue to retract during sliding of the fairing towards the front of the vehicle inside the housing, thereby enabling the bumper to be dismantled.

BRIEF DESCRIPTION OF THE DRAWINGS

In order to make the invention better understood, an embodiment thereof is described below by way of non-limiting example and with reference to the accompanying drawings, in which:

FIG. 9 is an elevation view of another bumper put into place on another fender using two fastening devices.

MORE DETAILED DESCRIPTION

Figure 1:
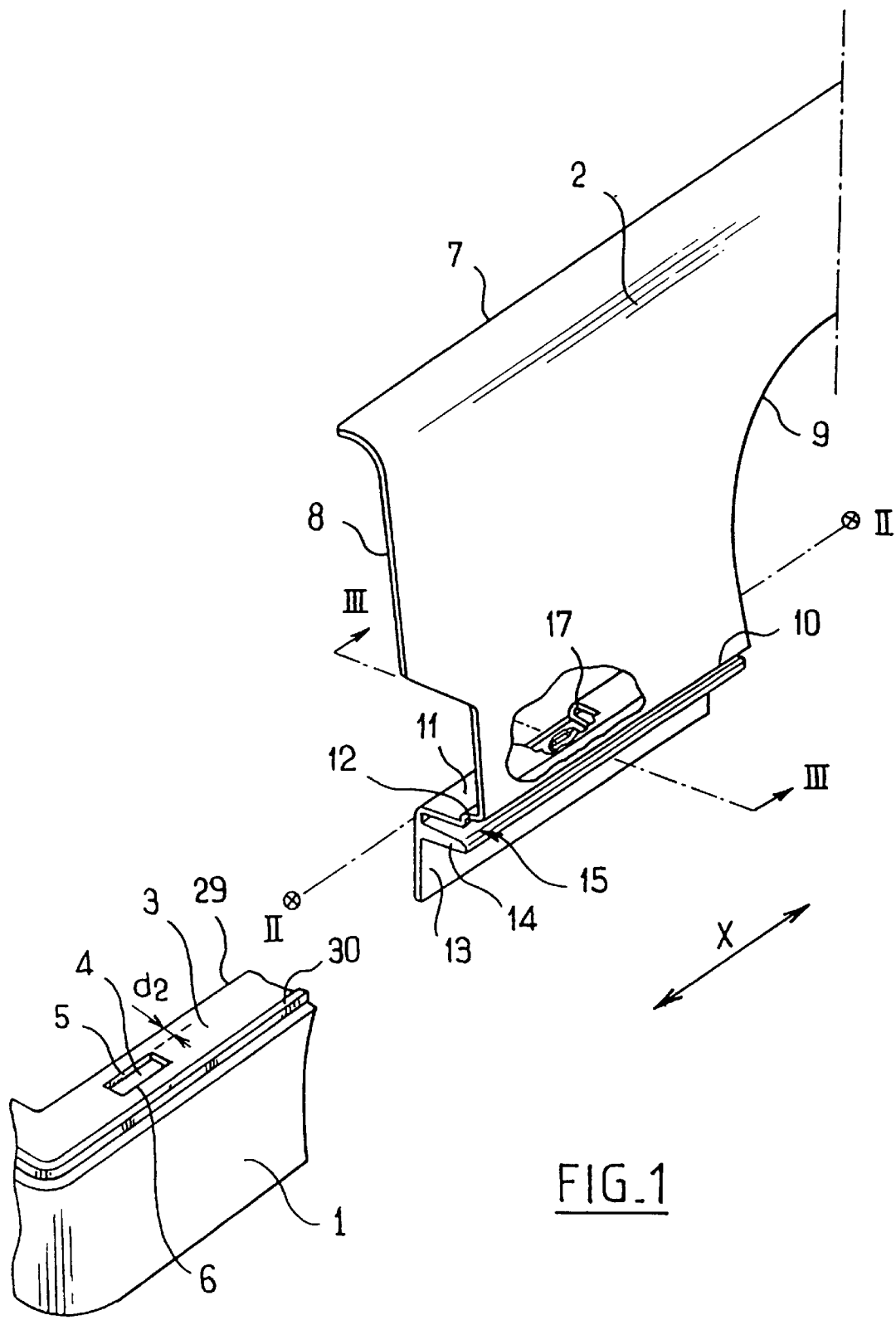
FIG. 1 is a partially cutaway perspective view of a motor vehicle fender and a bumper fairing.

In FIG. 1, there can be seen the left-hand fairing 1 of a front bumper of a motor vehicle (not shown) together with the front portion of the front left fender 2 of the same vehicle.

It can be seen that the fairing 1 has a plane top rim 3 directed towards the inside of the bumper. This rim is horizontal when the bumper is in its normal position of use.

Passing through its entire thickness, this rim has a rectangular window 4 whose long sides 5, 6 are parallel to the travel direction X of the vehicle.

The fender 2 is defined at its front end by a top edge 7 which runs along the hood, by a front boundary 8 which overlaps the headlight unit and the grille (not shown) of the vehicle, by a rear boundary 9 which defines a wheel arch, and by a bottom edge 10, along which the bumper fairing 1 is to be installed.

Beneath the bottom edge 10 and set back towards the inside of the vehicle, the fender has a structure that is designed to receive the bumper fairing 1.

This structure comprises a first partition 11 which extends substantially horizontally towards the inside of the vehicle and it has a setback 12 occupying about a first third of its width, followed by a vertical section partition 13 which extends downwards from the end of the first partition 11 and which carries a longitudinal rib 14 directed towards the outside of the vehicle and extending transversely as far as the setback 12 in the first partition, so as to co-operate therewith to define a housing 15 for the rim 5 of the bumper fairing 1.

Said housing 15 tapers in thickness from its opening beneath the bottom edge 10 of the fender towards its bottom where said thickness is substantially equal to the thickness of the rim 3.

The fender 2 is secured to the vehicle structure by two sliding fastenings (not shown) placed in orifices 16 of the bottom portion of the second partition 13.

Figure 2:
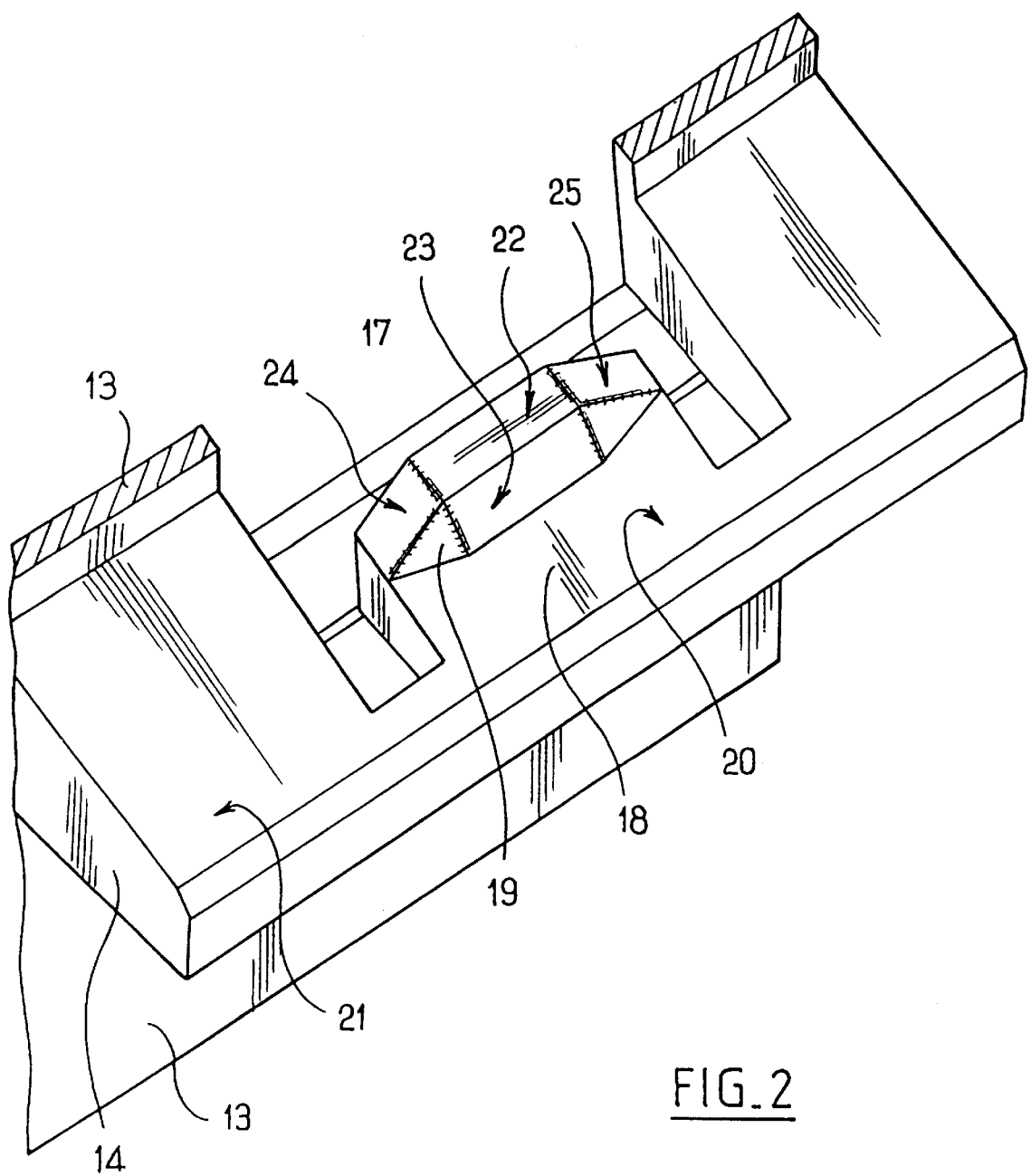
FIG. 2 is an enlarged view of a portion of FIG. 1 in section on II—II.

As can be seen in the partially cutaway portion of the fender, a housing 17 extends over a portion of the first partition 11 and of the second partition 13, in this case substantially in the middle of the length of the bottom edge 10 of the fender. In register with this recess 17, the rib 14 is cut out so as to leave a tongue 18 surmounted by a projection 19, as can be seen more clearly in FIG. 2.

The tongue 18 is integrally molded with the fender 2, and because of the recess 17, as provided in the first and second partitions, the fender can be unmolded without any need to make use of movable molding cores.

The tongue 18 is secured to the rib 14 via its edge 20 on the outside of the vehicle, remote from its projection 19.

Figure 4:
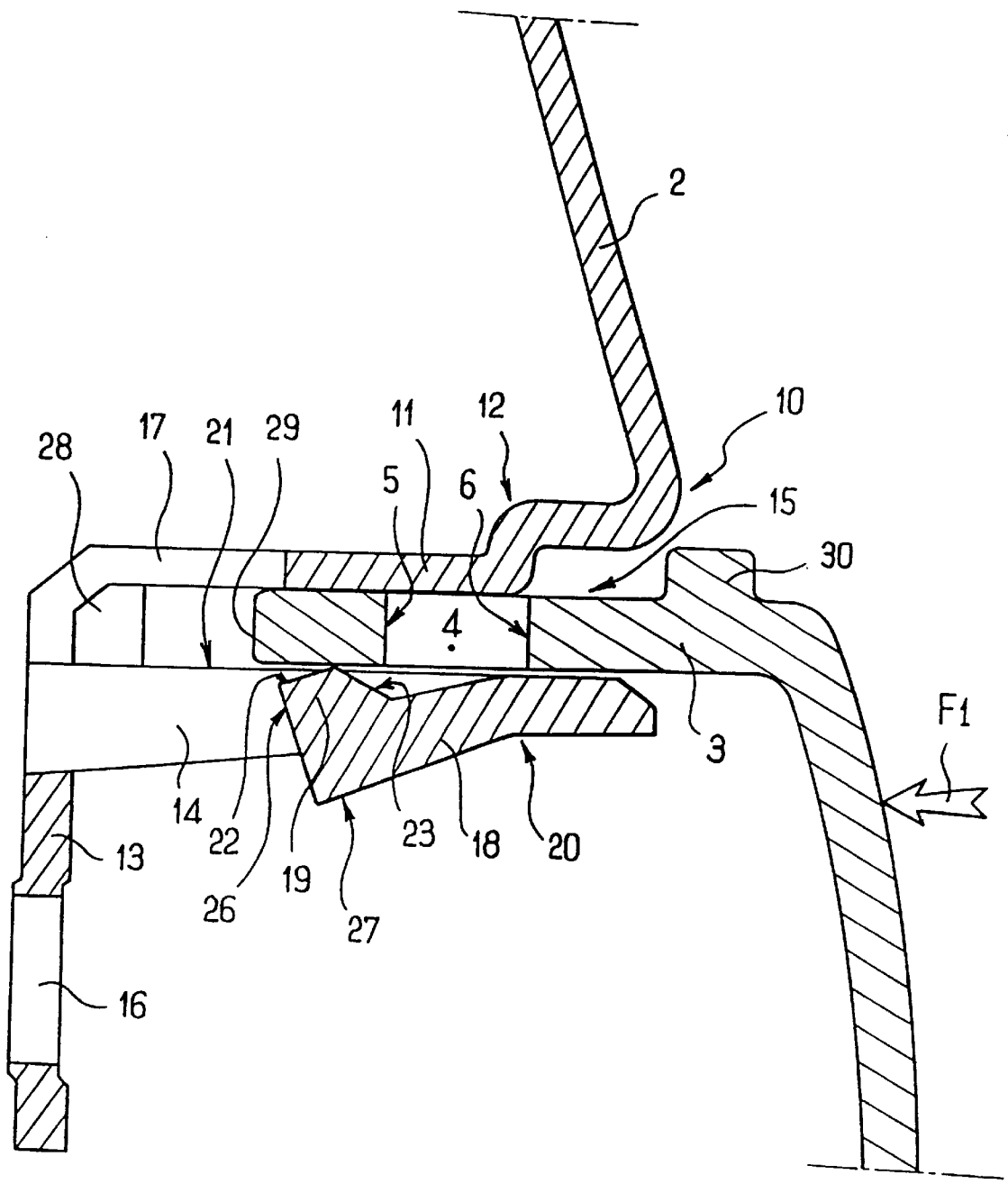
FIG. 4 is a view analogous to FIG. 3 while the rim is being engaged in the housing.
Figure 5:
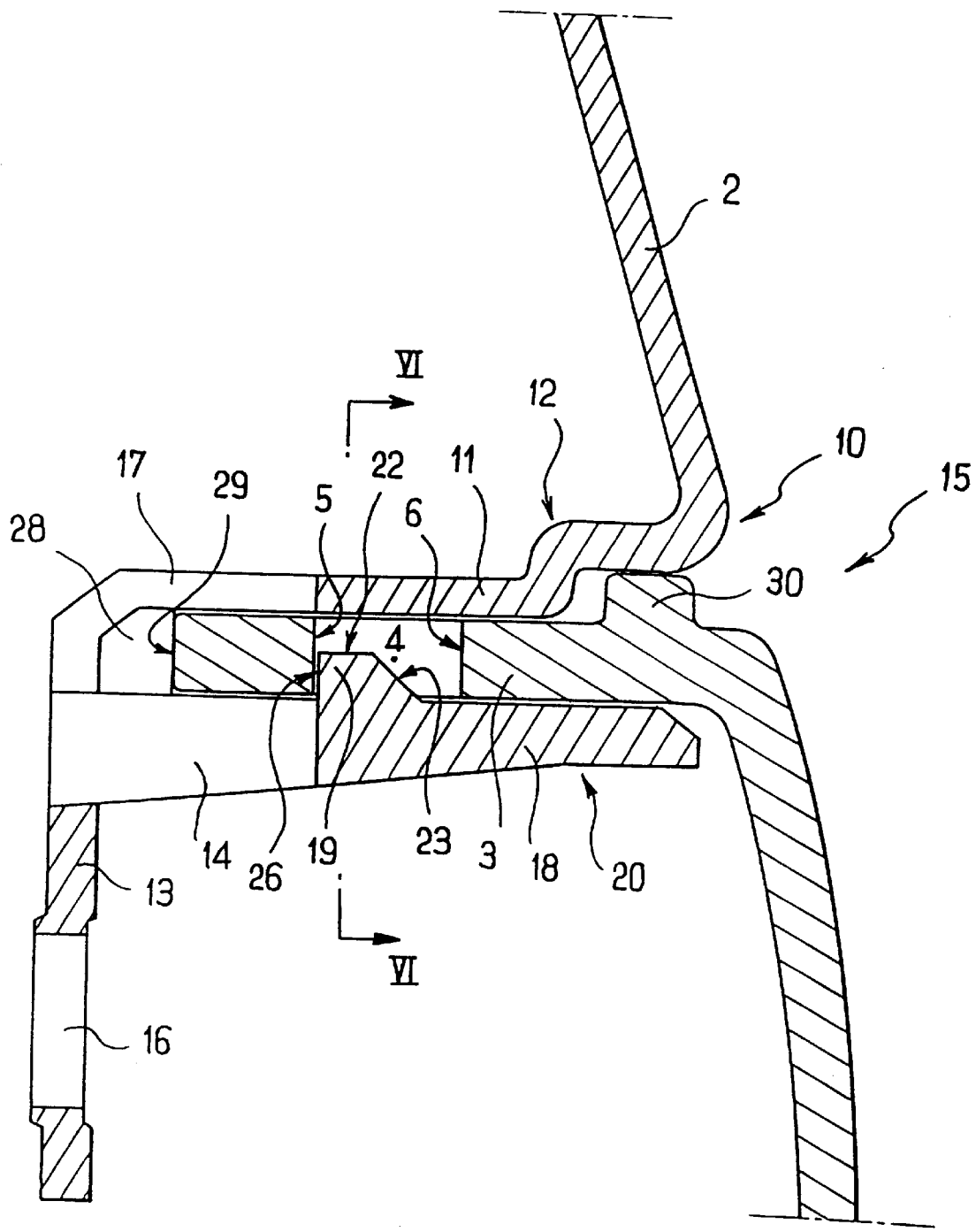
FIG. 5 is a view analogous to FIG. 3 after the rim has been put into place in the housing.
Figure 6:
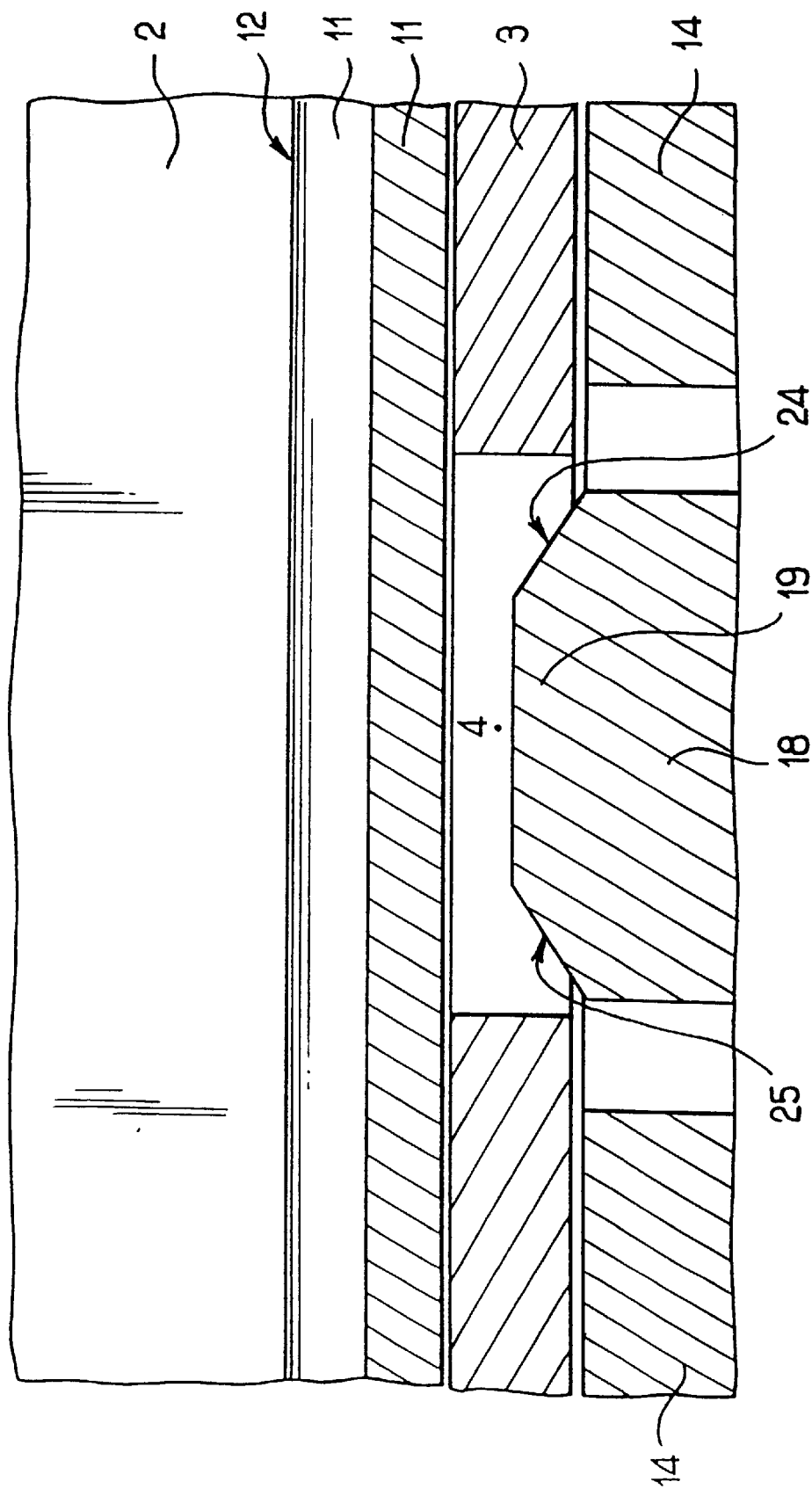
FIG. 6 is a section view on VI—VI of FIG. 5.
Figure 8:
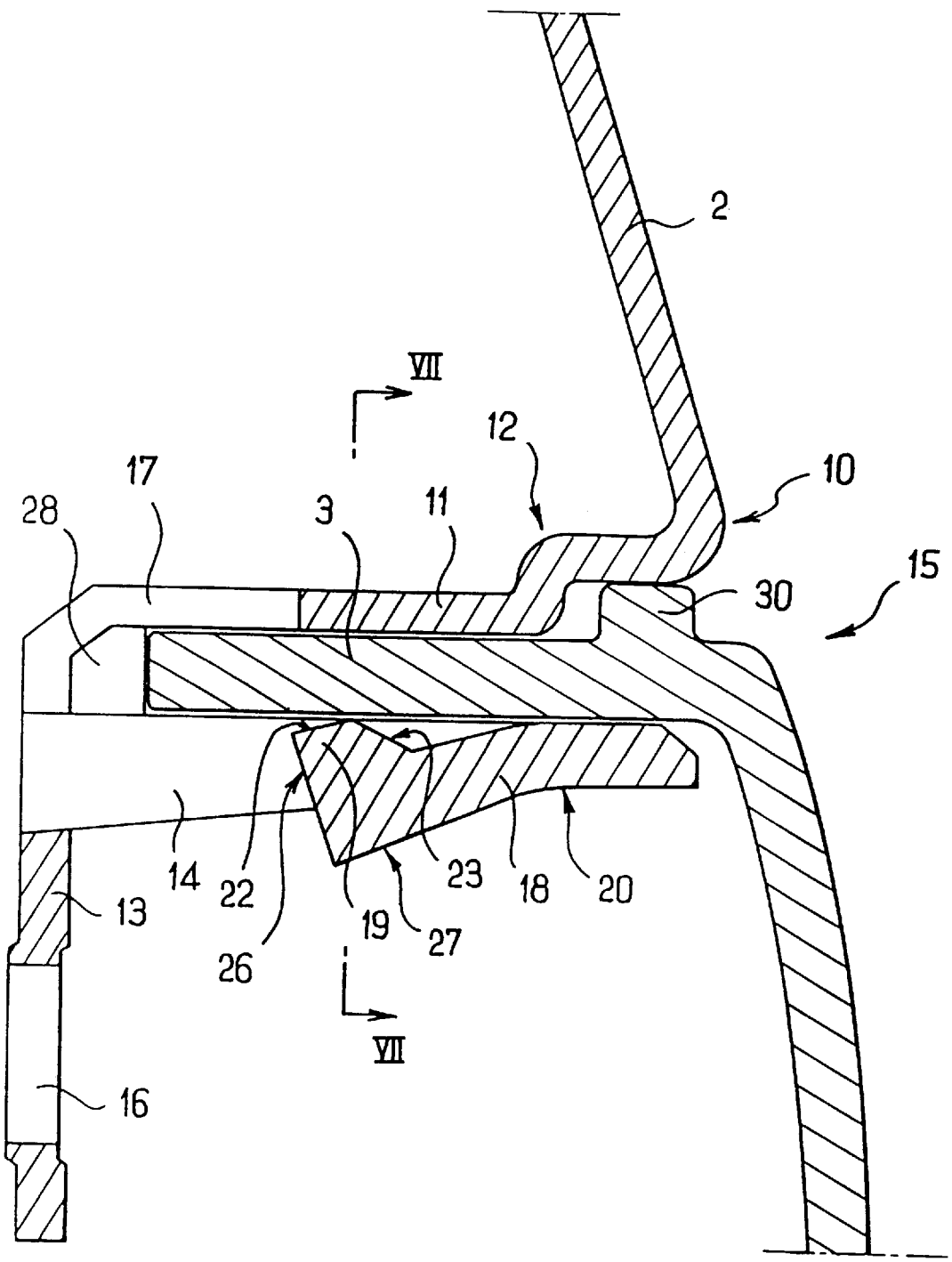
FIG. 8 is a section view on VIII—VIII of FIG. 7.

Because of the resilience of the plastic material from which the fender is made, the tongue can bend elastically under the effect of a downwardly directed force exerted on its projection, as can be seen in FIGS. 4 and 8.

The projection 19 of the tongue projects from the surface thereof, which surface is itself situated in the plane of the top face 21 of the rib 14.

Said projection 19 has a substantially horizontal top face 22 which is connected to the plane of the top face 21 of the rib 14 by a first chamfer 23 situated on the side of the projection that faces towards the outside of the vehicle, by a front second chamfer 24, and by a rear third chamfer 25, situated respectively at the front and the rear of the top surface 22, in the travel direction of the vehicle, i.e. parallel to the bottom edge 10 of the fender.

It will be observed that the edges between the chamfers of the projection are rounded so as to facilitate sliding of the rim of the fairing over the projection and so as to facilitate passage thereof over any of the chamfers or edges between them, assuming that the direction in which the bumper is put into place or removed includes a component that is perpendicular to the travel direction of the vehicle, and also a component that is parallel to the travel direction of the vehicle.

On its side looking towards the inside of the vehicle, remote from the first chamfer 23, the projection 19 has a vertical face 26 perpendicular to the plane of the top face 21 of the rim, which vertical face 26 extends over the full height of the tongue down to its bottom face 27.

The dimensions of the projection 19 are selected in such a manner to enable it to penetrate into the window 4 formed through the thickness of the rim 3 on the bumper fairing 1.

At the bottom of the housing 15, there are provided abutments 28 against which the rim 3 of the bumper fairing comes to bear so as to position it accurately in the transverse direction relative to the fender.

The length of the tongue 18 is such that its vertical face 26 is spaced apart from the abutments 28 by a distance d1 that is substantially equal to the distance d2 between the inside edge 5 of the window 4 and the inside edge 29 of the rim 3 of the fairing.

Figure 3:
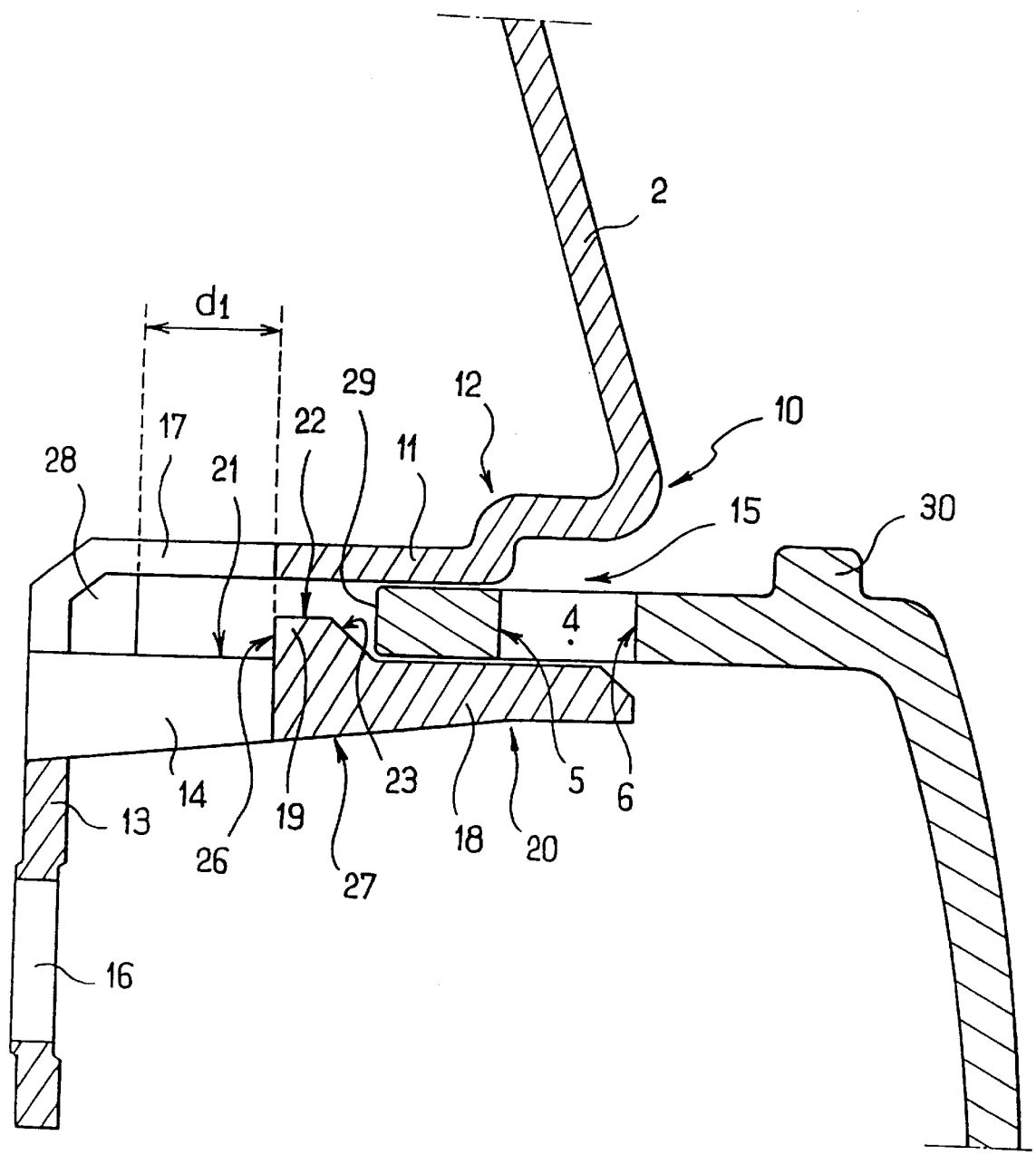
FIG. 3 is an enlarged view in section on III—III of FIG. 1.

The bumper is put into place as follows:

The fairings 3 of the bumper are splayed slightly outwards so as to position them in register with the housings 15 in each of the fenders, and then the fairings are moved inwards so as to bring their rims 3 into the openings of the housings 15, as can be seen in FIG. 3.

Thereafter, a horizontal force F1 directed towards the inside of the vehicle is applied to each of the fairings.

The inside edge 29 of the rim transmits this force F1 to the projection 19 on the tongue 18 whose first chamfer 23 transforms said horizontal force F1 into a force having a component that is directed downwards, thereby deforming the tongue 18 until it reaches the position shown in FIG. 4 in which the projection 19 is fully retracted, thereby releasing the section of the housing 15 so that the rim 3 of the fairing can pass therethrough.

Once the edge 29 of the rim 3 comes to bear against the abutments 28 situated in the bottom of the housing, the window 4 is in register with the projection 19. The tongue 18 therefore returns to its initial shape with the vertical face 26 of the projection bearing against the long side 5 of the window that is situated on the inside of the vehicle.

The rim 3 is thus prevented from moving transversely.

The abutments 28 are preferably located on either side of the tongue 18 so as to allow the fairing together with its rim 3 to bend to a small extent in the longitudinal direction, i.e. in the travel direction X of the vehicle, so that the inside long side 5 of the window can separate cleanly from the tongue 18 when the edge 29 of the rim 3 engages the abutments 28, and then returns resiliently to bear against the inside vertical face 26 of the tongue. By providing a tongue that is very slightly longer, it is also possible to "tension" the rim between the abutments 28 and the projection 19.

For vertical positioning, the rim 3 has a longitudinal rim 30 running along its top edge, which rib bears against the portion of the first partition 11 of the fender that is situated ahead of the vertical setback 12 and prevents bumper assembly damaging the paint work on the fender.

This longitudinal rib 30 of the fairing also serves to mask the inside of the housing 15, the window 4, and the tongue 18, which are thus hidden from the outside of the vehicle.

In another variant (not shown), the rim of the fairing bears directly against the first partition 11, which then does not have a setback.

With the transverse and vertical positioning of the fairing provided in this way, the fairing is held in place longitudinally by means of a screw 31 which may, for example, be situated close to the wheel arch, as shown in FIG. 9.

The operations for dismantling the bumper are described below.

The first step consists in removing the above-mentioned screw 31.

Figure 7:
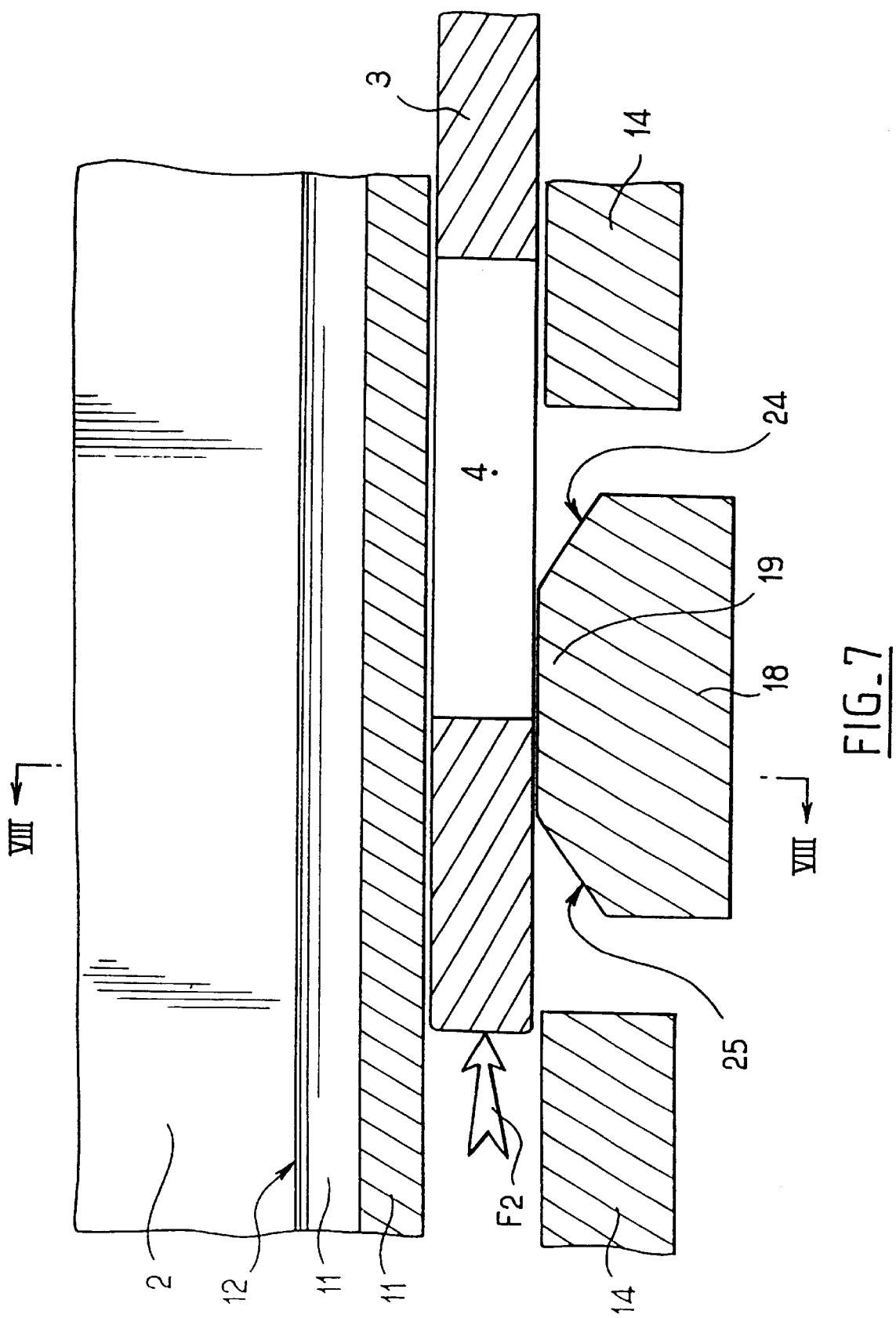
FIG. 7 is a view analogous to FIG. 6 while the rim is sliding towards the front of the vehicle.

In a second step, the fairings 3 of the bumper are caused to slide forwards over a stroke that is not less than the length of the rear third chamfer 25 so that the force F2 exerted on the fairing causes the chamfer 25 to retract, as can be seen in FIG. 7.

Once the projection 19 has been retracted, the fairings 3 of the bumper are splayed apart by pulling them outwards from the vehicle, thereby releasing the bumper.

FIG. 9 is a diagram showing another bumper similar to that described above and in position on a fender that is likewise similar to the above fender.

The fender 2' has tongues (not shown) at locations indicated by points 18' in FIG. 9.

The rim of the bumper fairing 1' has two windows, each in register with one of the tongues.

The bumper is thus positioned relative to the fender by two fastening devices, which position it laterally and vertically. Its longitudinal position is guaranteed by the screw 31, which passes through the rim of the fairing, and through the first partition of the fender.

In the light of the above examples, it can be seen that the fastening device of the invention makes it possible to mount and dismantle the bumper fairings very simply and very quickly on the fenders of the vehicle.

Naturally the embodiments described above are not limiting in any way and any desirable modifications can be made thereto without thereby going beyond the ambit of the invention.

In particular, it will be understood that the invention is equally applicable to the rear end of a vehicle as well as the front end.

What is claimed is:

1. A device for fastening bumper fairings to the fenders of a motor vehicle, the device comprising, on each bumper fairing, an inwardly-directed plane top rim and, beneath the front bottom edge of a fender, a housing for said rim, the thickness of the housing being substantially equal to or slightly greater than the thickness of said rim, a window being formed in the rim of the bumper fairing, while a resilient tongue is provided in the thickness of the housing to penetrate into said window when the bumper is in place, thereby retaining the rim in its housing, wherein the tongue has a projection designed to penetrate into the window of the rim, and wherein the projection is provided on its outer side directed towards the outside of the vehicle, with a first chamfer which, during movement of the fairing in translation perpendicular to the travel direction of the vehicle, causes the tongue to retract on engaging the edge of the fairing, and on its front side directed towards the front of the vehicle, with a second chamfer which, during sliding of the fairing towards the rear of the vehicle, causes the tongue to retract on engaging the rim of the fairing.

2. A device according to claim 1, wherein the projection also has a third chamfer on its rear side facing towards the rear of the vehicle, to cause the tongue to retract during sliding of the fairing towards the front of the vehicle inside the housing, thereby enabling the bumper to be dismantled.

3. A device according to claim 1, wherein abutments are provided in the bottom of the housing.

4. A device according to claim 1, wherein the rim has a longitudinal rib bearing against a partition which extends substantially horizontally towards the inside of the vehicle beneath the bottom edge of the fender.

5. A device according to claim 1, further including a screw passing through both the fairing and the fender and serving to hold the bumper in the travel direction of the vehicle.

6. A device according to claim 1, wherein its component parts are integrally molded with the fender and with the bumper.

7. A device for fastening bumper fairings to the fenders of a motor vehicle, the device comprising, on each bumper fairing, an inwardly-directed plane top rim and, beneath the front bottom edge of a fender, a housing for said rim between two substantially parallel walls, the thickness of the housing being substantially equal to or slightly greater than the thickness of said rim, a window being formed in one of the walls of the housing, while a resilient tongue is provided in the rim of the bumper fairing, protruding towards said window to penetrate into said window when the bumper is in place, thereby retaining the rim in its housing, wherein the tongue has a projection designed to penetrate into the window of the rim, and wherein the projection is provided on its inner side directed towards the inside of the vehicle, with a first chamfer which, during movement of the fairing in translation perpendicular to the travel direction of the vehicle, causes the tongue to retract on engaging the edge of the fairing, and on its rear side directed towards the rear of the vehicle, with a second chamfer which, during sliding of the fairing towards the rear of the vehicle, causes the tongue to retract on engaging the rim of the fairing.

8. A device according to claim 7, wherein the projection also has a third chamfer on its front side facing towards the front of the vehicle, to cause the tongue to retract during sliding of the fairing towards the front of the vehicle inside the housing, thereby enabling the bumper to be dismantled.

9. A device according to claim 7, wherein abutments are provided in the bottom of the housing.

10. A device according to claim 7, wherein the rim has a longitudinal rib bearing against a partition which extends substantially horizontally towards the inside of the vehicle beneath the bottom edge of the fender.

11. A device according to claim 7, further including a screw passing through both the fairing and the fender and serving to hold the bumper in the travel direction of the vehicle.

12. A device according to claim 7, wherein its component parts are integrally molded with the fender and with the bumper.

* * * * *